United States Patent
Fleischmann

(10) Patent No.: US 9,329,272 B2
(45) Date of Patent: May 3, 2016

(54) 3D CAMERA AND METHOD OF IMAGE PROCESSING 3D IMAGES

(71) Applicant: Infineon Technologies AG, Neubiberg (DE)

(72) Inventor: Gerwin Fleischmann, Graz (AT)

(73) Assignee: Infineon Technologies AG, Neubiberg (DE)

( * ) Notice: Subject to any disclaimer, the term of this patent is extended or adjusted under 35 U.S.C. 154(b) by 291 days.

(21) Appl. No.: 13/875,313

(22) Filed: May 2, 2013

(65) Prior Publication Data

US 2014/0327741 A1  Nov. 6, 2014

(51) Int. Cl.
- *H04N 13/02* (2006.01)
- *G01S 17/89* (2006.01)
- *G01S 17/36* (2006.01)

(52) U.S. Cl.
CPC *G01S 17/89* (2013.01); *G01S 17/36* (2013.01)

(58) Field of Classification Search
USPC ............. 348/46, 47, 44, 94, 342, 354, 383, 348/433.1, 470, 475, 508, 639, 646, 651, 348/660, 711, 720, 724, 750, 759, 839; 345/419, 420, 426; 382/103, 106, 154, 382/199, 282, 305
See application file for complete search history.

(56) References Cited

U.S. PATENT DOCUMENTS

| | | | |
|---|---|---|---|
| 7,791,715 B1* | 9/2010 | Bamji | 356/5.1 |
| 8,174,539 B1* | 5/2012 | Samaniego et al. | 345/619 |
| 2008/0069553 A1* | 3/2008 | Li et al. | 396/125 |
| 2010/0002912 A1* | 1/2010 | Solinsky | 382/117 |
| 2010/0183236 A1* | 7/2010 | Kang et al. | 382/260 |
| 2011/0069155 A1* | 3/2011 | Cho et al. | 348/47 |
| 2011/0188028 A1* | 8/2011 | Hui et al. | 356/5.01 |
| 2011/0292370 A1* | 12/2011 | Hills et al. | 356/5.01 |
| 2011/0304841 A1* | 12/2011 | Bamji et al. | 356/5.01 |
| 2012/0120073 A1* | 5/2012 | Haker et al. | 345/420 |
| 2013/0093852 A1* | 4/2013 | Ye | 348/46 |

OTHER PUBLICATIONS

A Progressive Morphological Filter for Removing Nonground Measurements From Airborne LIDAR Data Kecu Zhang et al. IEEE Transactions on Geoscience and Remote Sensing, vol. 41, No. 4, Apr. 2003, pp. 872-882.
Computer Aided Wafer Inspection: Integration of a CCD-Camera module and investigation of image processing methods for supporting human operator's work Gerwin Fleischmann, Diploma Thesis, University of Salzburg, Jun. 12, 2007, pp. 1-118.

* cited by examiner

*Primary Examiner* — Jeffrey Harold
*Assistant Examiner* — Mustafizur Rahman
(74) *Attorney, Agent, or Firm* — Schiff Hardin LLP

(57) ABSTRACT

A method comprises obtaining first information, the first information including depth information with a first range of unambiguity. A first image processing is performed on the first information to generate first modified information. Furthermore, second information is obtained, the second information including depth information with a second range of unambiguity.

23 Claims, 8 Drawing Sheets

3D CAMERA AND METHOD OF IMAGE PROCESSING 3D IMAGES

BACKGROUND

Three dimensional Depth-Cameras (3D cameras) which are for example based on the ToF principle (time-of-flight principle) or other principles provide a new technology field with many applications. To give only one of many applications, 3D cameras may provide human gesture recognition in natural user interfaces or passenger recognition for automotive safety functions. Distinguished from 2D cameras, 3D cameras provide an array of pixel in which each pixel is capable to provide information related to a distance of the object captured by the pixel. Such information may for example be based on a time of flight of light reflected from an object captured by the pixels.

Furthermore, image processing is known as a digital technique which is in conventional systems applied after obtaining images. For example, image processing has been used in restoring pictures by scanning them into a digital image and applying the digital image processing algorithms to improve the quality by removing blurring, increasing the contrast of the image etc. Furthermore, image processing techniques are also implemented in 2D cameras and video apparatuses to provide image processed digital images to users.

In view of the above it would be beneficial to have a concept which is capable of providing image processing of 3D images with a high degree of performance.

DETAILED DESCRIPTION

Figure 1:
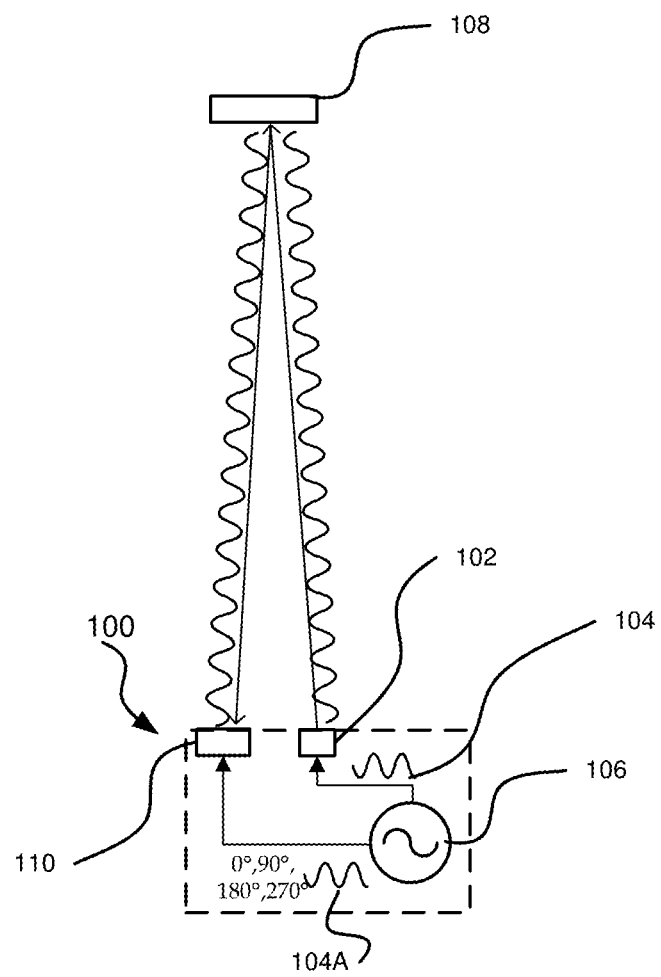
FIG. 1 shows a block diagram according to an embodiment.

The following detailed description explains exemplary embodiments. The description is not to be taken in a limiting sense, but is made only for the purpose of illustrating the general principles of embodiments while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The embodiments described below are directed to a new concept for providing image processing for 3D image data obtained based on the time of flight (TOF) principle. According to some embodiments described herein, the digital image processing for a 3D image is as a pipelined digital image processing which can provide reduced latency as will be described later on in more detail.

In conventional 3D TOF cameras based on the photonic mixing principle a phase of reflected light is determined by mixing reflected modulated light in each pixel of a pixel array with a demodulation signal of the same modulation frequency.

FIG. 1 shows an embodiment of a TOF camera 100 based on the photonic mixing principle. Light generated by a light source 102 is continuously amplitude modulated based on a modulation signal 104 generated by a signal source 106. The modulation signal may include a rectangular waveform, a sine waveform of other signal waveforms. The modulated light signal is provided to determine the distance to an object 108. The modulated light reflected by the object 108 is directed to an imager device 110 which includes pixels as shown for example in the embodiments described with respect to FIGS. 1A, 2A, 3, 4 and 5. In the imager device 110, a signal 104A which corresponds to the modulation signal 104 phase shifted by a predetermined phase, e.g. 0°, 90°, 180° and 270°, is provided to the control electrodes for mixing and demodulation of the reflected light within each pixel. Certain time intervals are assigned for each of the predetermined phases. After integrating the signals in the respective time intervals for each phase 0°, 90°, 180° and 270°, output signals I0, I1, I2, and I3 are obtained corresponding to each phase. Based on the output signals I0, I1, I2, I3, the phase information corresponding to the time to travel can be computed as is known to a person skilled in the art. It is to be noted that the structure of FIG. 2A having two read-out nodes at both sides allows to simultaneously obtain the phases I0 and I2 and the phases i1 and I3, respectively.

In the embodiment shown in FIG. 1, the signal 104A is provided in time intervals phase shifted with respect to the modulation signal 104. It is to be understood that only the relative phase shift of the modulation signal and the demodulation signal is required. Therefore, in other embodiments a system with interchanged signals 104 and 104A may be provided in which the modulation signal 104 for the light modulation is phase shifted in different time intervals with respect to the signal 104A which is provided with no phase change.

When only one modulation frequency is used, the distance of objects only within a limited range can be determined with certainty in the distance from the phase information. If f is the frequency of the modulation signal and c is the speed of light, then only objects which are within a range of unambiguity (unambiguousness) l=c/(2·f) can be identified without ambiguity. The distance of objects which are distributed in a range greater than the range of unambiguity can be determined only with ambiguity as the demodulated signal can only determine a phase between 0 and 360°. Phase shifts greater than 360° cannot be distinguished by the photonic mixing system from a corresponding phase shift in the interval [0, 360]. For example a phase shift of x+n·360° (0°<x<360°, n being an integer number) cannot be distinguished from the corresponding phase shift x in the interval [0, 360°].

It is apparent from the above that the range of unambiguity is directly dependent on the modulation frequency. If modulations with different modulation frequency are used, then the range of unambiguity can be extended. In theory, two different modulation frequencies may be sufficient to extend the range of unambiguity if each distance within the extended range of unambiguity has a unique phase combination (φ1, φ2), with φ1 being the phase shift due to the time of flight corresponding to the modulation with a first frequency f1 and φ1 being the phase shift due to the time of flight corresponding to the modulation with a second frequency f2. By combining the phase shift data corresponding to the first frequency with the phase shift data corresponding to the second modulation frequency the distance can be measured within the range of unambiguity as is known to a person skilled in the art. Since however measurement errors exist for each phase measurement, in some embodiments two modulations with different frequencies may not be enough to determine the distance. Therefore, according to some embodiments three, four or even more different modulation frequencies may be used in order to extend the range of unambiguity. In some embodiments, the number of different frequencies used for extending the range of unambiguity may be programmed by a user.

Figure 2:
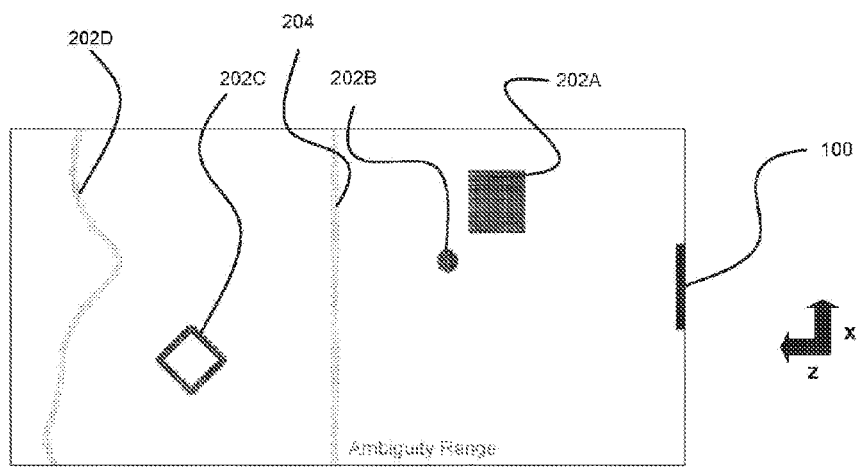
FIG. 2 shows example scenery.

FIG. 2 shows example scenery including a plurality of objects 202A-202D extending in z and x-directions. For the sake of simplicity, only the depth direction z and one (x-direction) of the two other directions is shown. It is however to be noted that the embodiments herein explained with respect to the z and x-direction are easily transformed by a person skilled in the art to include also the y-direction.

Figure 3A:
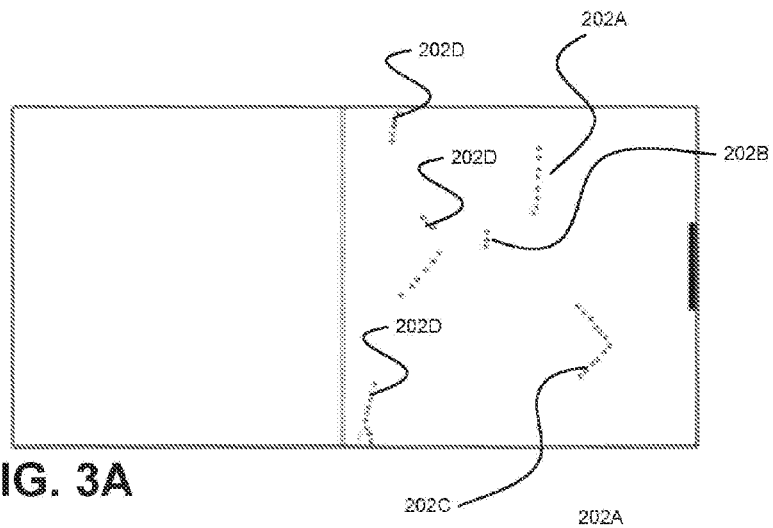
FIGS. 3A and 3B show image data of the scenery of FIG. 2.
Figure 3B:
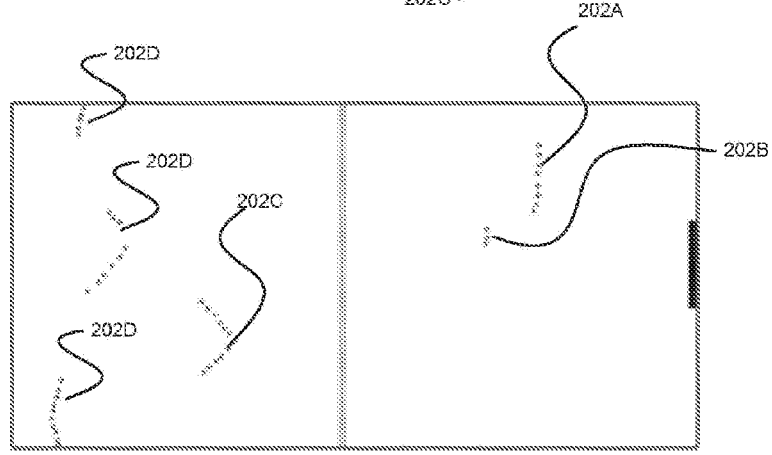

In FIG. 2, the objects 202A-202D are shown to be positioned at some distances in the z-direction (depth direction) away from the 3D camera 100. A boundary of the range of unambiguity is indicated with reference number 204 in FIG. 2. As explained above, objects which are distributed in a range extending beyond the boundary 204 cannot be determined unambiguous by the phase information of the 3D TOF camera 100 when using only the first modulation frequency. FIG. 3A shows the 3D pixel image data (pixel information from the pixel array including the measured phase shift or a representation of the measured phase shift) as a frame obtained by the 3D TOF camera 100 during a first time interval when the light is modulated with the first modulation frequency. As can be seen, since the first modulation frequency allows distance information only to be determined unambiguous if the objects are in a range up to the boundary 204, pixels which detect light reflected by objects beyond the boundary 204 such as objects 202C and 202D are therefore folded back in the range of unambiguity although they are actually located beyond the unambiguity boundary.

By using a second modulation frequency (or further modulation frequencies) different from the first modulation frequency in a time interval following the time interval of the first modulation frequency and combining the 3D image data obtained with the second modulation frequency with the 3D image data obtained with the first modulation frequency, an increased range of unambiguity is obtained. Such combinations of measurements with different frequencies in order to extend a range of unambiguity are known to a person skilled and will therefore not be discussed herein. The result of the combination can be seen in FIG. 3B which shows that pixels corresponding to the objects 202C and 202D beyond the boundary 204 are corrected and now have their true distances.

Instead of providing digital image processing only after the final 3D ToF image with correct absolute distance information is available, embodiments described herein use a pipelined approach in which uncombined 3D image data having a respective limited range of unambiguity (non-extended range, when compared to the final 3D image with extended range) are processed with an image processing algorithm.

In other words, the image processing is applied in embodiments to image data (e.g. phase information or representation of phase information measured by the pixel array) resulting from using only one modulation frequency even though the absolute distance information cannot be certain. Although the input data for the digital image processing provides a full 3D image, for measurements of objects which are distributed in a range extending beyond the unambiguity boundary such input data can be considered imperfect since it is based only on one modulation frequency and therefore has inherent a lack of certainty in the distance information. Or to say in other words, the uncombined 3D image data at this stage may contain incorrect absolute distance information for some pixels. At this point, it is worth to mention that the term image processing as used herein is to be distinguished from the analog or digital processing of signals to obtain an output signal for each single pixel which may for example also include some analog or digital filtering. Image processing is typically provided by using digital algorithms uses information of one pixel together with information of one or more other pixels in order to provide a modified image after the image processing. Typically, image processing is provided to the full set of image data obtained from the pixel array. For example image processing may include an image filtering which uses pixel information from all pixels of the pixel array provided in a frame as input data.

Image processing may typically include the use of computing algorithms which are applied to the digital input data. Image processing may include a wide range of algorithms to be applied to the input data.

In some embodiments, the application of image processing is used for example to provide to the user a filtered 3D image in which objects of sizes out of interest for the application are not presented to the user. The term user may herein not be interpreted only as a human being but can according to embodiments also include applications such as driver assistance applications, human recognition applications etc. For such applications, the size of the object of interest may for example be limited to a maximum size, a minimum size or both. In some embodiments, the digital data may be modeled in the image processing in the form of multidimensional systems and specific image processing computing algorithm are applied to these data.

Image processing may in some embodiments include surface reconstruction, depth image meshing using multiple steps, gradient detection, edge detection, object movement detection, object recognition, object suppression or any combination thereof. In some embodiments, image processing may include one or more of classification, feature extraction, pattern recognition, edge recognition, projection, multi-scale signal analysis and other processing. One or more techniques which may be used in image processing include pixilation, linear filtering, non-linear filtering, principal components analysis, independent component analysis, hidden Markov models, anisotropic diffusion, partial differential equations, self-organizing maps, neural networks and wavelets.

In some embodiments, image processing uses morphological filter operations which are simple but efficient and applicable for several kinds of image processing. The methodology of such filters is set-theory based and the filter operations consist of minimum and maximum operation. Progressive morphological filters may be used to suppress ground objects and preserve the ground surface, but in other applications morphological filters may be used for a various range of applications. The algorithm typically takes a few cycles for applying different window sizes of the filter kernel. The ToF measurement procedure offers an architecture that allows a utilization of the algorithm with good performance.

When applying the image processing to imperfect data with uncertain absolute distance information, correction for absolute distance information is provided according to embodiments in order to obtain a final image processed 3D image with corrected absolute distance information. In embodiments, such corrections are applied in a pipeline stage further downstream, when at least 3D pixel data obtained with the second modulation frequency is taken into account to extend the range of unambiguity and to correct a distance. It is to be noted that at least for some image processing the errors in absolute distance has no or limited relevance. For example, if edge detection in the image is performed, an abrupt change of the relative phase information detected amongst nearest pixels or a group of nearest pixels gives the indication that an edge exists at these pixels or group of pixels. For the detection of the edge, the final absolute distances are of less importance. In other words, it is not so important for the recognition of an edge whether the distance jumps at the edge in absolute values from 0.1 m to 0.3 m or from 0.2 m to 0.3 m or from 0.2 m to 2 m. Therefore, if in the 3D image data based on only one modulation frequency an abrupt jump of the relative distance (relative phase) can be detected, a valid assumption can be made also for the final non-ambiguous 3D image that an edge exists at the respective pixel location. In embodiments, also an image processing of the image with extended range of unambiguity is performed. This avoids that structures are overseen at the image processing of the data with limited range of unambiguity. For example, if adjacent pixels would capture two distances corresponding to an edge and the difference of these two distances would be exactly the range of unambiguity of the corresponding modulation frequency then the measurement of these distances would result in exactly the same phase information measured in the adjacent pixels. Therefore, during image processing of the image with limited range of unambiguity an edge would not be detected as it would be assumed that no edge exists in view of the identical phase information. The image processing of the image with extended range would however detect this edge and correct the image processed information resulting from the image processing of the image data with reduced range of unambiguity.

An embodiment including a simplified image filtering applied to image data in order to filter out certain features having a size out of interest will now be explained in more detail with respect to FIGS. 4A and 4B.

Figure 4A:
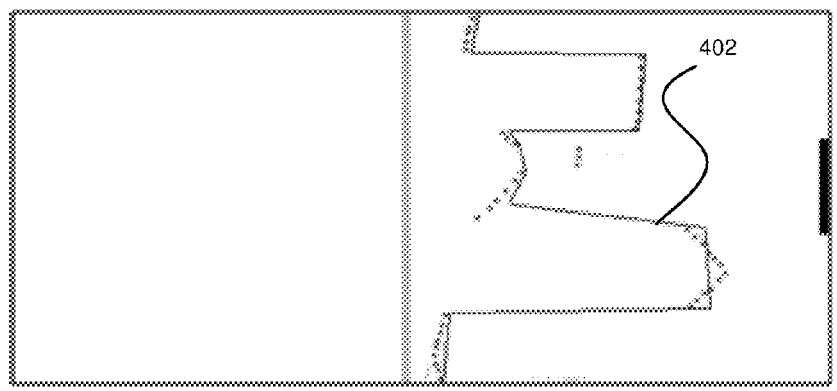
FIGS. 4A and 4B show image processed data of the scenery of FIG. 2.
Figure 4B:
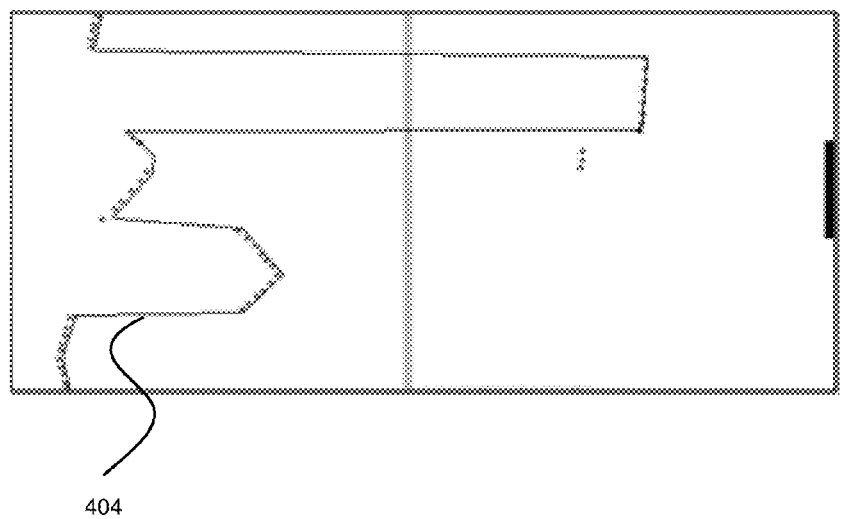

FIG. 4A shows a filtering of the image data shown in FIG. 3A. It is to be noted that the image data of FIG. 3A is imperfect image data in view of the limited range of unambiguity and the incorrect absolute distance values for the pixels corresponding to objects 202C and 202D. The filtering shown in FIG. 4A is a coarse filtering in order to filter out objects having a size below a minimum value. The curve resulting from the coarse filtering is provided in FIG. 4A with reference number 402. As can be seen, the pixels corresponding to object 202B have been filtered out since the size of object 202B is below the filtering criteria. Furthermore, it can be seen that curve 402 provides a coarse outline of the objects 202A, 202C and 202D with the absolute distance information for objects 202C and 202D being incorrect due to the reduced range of unambiguity. Referring now to FIG. 4B, it can be seen that a fine filtering has been performed resulting in a finer approximation curve 404 including representations of the objects 202C, 202D and 202A. Furthermore, it can be seen that the distance information of objects 202C and 202D is corrected. The fine filtering may in some embodiments be based on the coarse filtering and information from the coarse filtering can be used in the fine filtering. Therefore, the pixel information corresponding to the light reflected from object 202B is not considered for the fine-filtering since object 202B had already been filtered out in the previous coarse filtering.

Figure 5:
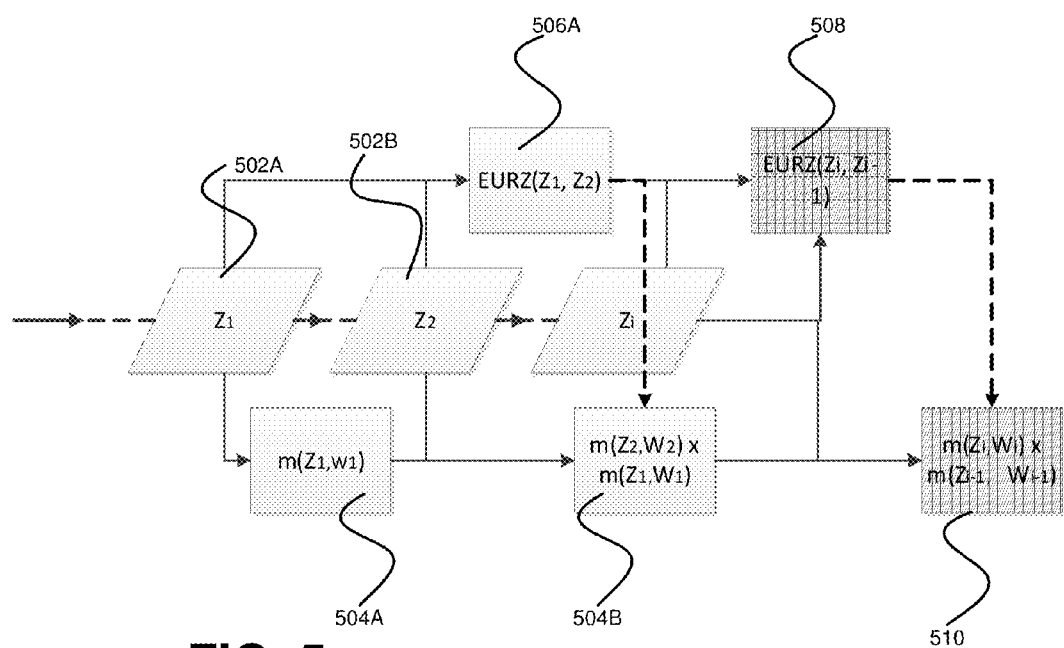
FIG. 5 shows a modular architecture according to an embodiment.

FIG. 5 shows a schematic architecture according to an embodiment in which image processing is performed at different stages. Frames Z1, Z2 . . . Zi with each frame including depth information (e.g. a measured phase or representations thereof) from each pixel of the camera's pixel array are entering the process flow at the different points in time, e.g. when the 3D image data are available. Frame Z1 (reference number 502A) has been obtained by using a first modulation frequency, frame Z2 (reference number 502B) has been obtained by using a second modulation frequency with a value different from the first modulation frequency etc. When frame Z1 is available, the image processing such as a coarse filtering with a filter parameter (window size) w1 for frame Z1 starts to generate the image processed data frame 504A (indicated in 504A by m(Z1,w1)). When frame Z2 is available, frame Z1 and frame Z2 can be combined to obtain EURZ frame 506A (Extended Unambiguity Range Z-Frame 506A). Furthermore at the time when frame Z2 is available, image processing on frame Z2 such as a fine filtering with a filter parameter w2 starts. Both processes, i.e. the combining of frame Z1 and frame Z2 and the image processing on frame Z2 can be processed in some embodiments at least partially in parallel.

In other words, information from the already image processed frame 504A as well as distance information of extended unambiguity range frame 506A are used to obtain a frame 504B. Thus, frame 504B is obtained by combining the image processing of frame Z2 which is indicated by m(Z2, W2) with the coarse filtering information and the extended unambiguity range information.

In more detail, according to the embodiment shown in FIG. 5, when the second frame Z2 is available the image processing operation can be immediately applied to frame Z2 using the next image processing parameter in the sequence of image processing to be applied. Such an image processing parameter may be for example a filter parameter $w_2$. As soon as the corrected EURZ data 506A is available, the information can be used to update the filter output—the dashed line represents the update function u. Therefore, for each of the frames Z1, Z2, Zi different image processing may be applied, including image processing of same type with different parameters or image processing of a different type. This scheme can be repeated for each frame Zi until a final EURZ frame 508 and a final image processed frame 510 is obtained.

In view of the above it is apparent that the image processing such as an image filter process starts before the final result of the EURZ measurement with detailed and unambiguous depth information is available. The approach can be applied to a wide range of available image processing techniques which however have to be suitable or made suitable to be applied in the above architecture. In embodiments, image filters with filter function m suitable for the above architecture may include filters with more than one pass on the input image ($w_i$ denotes the filter parameter for pass i), in which the input of the subsequent filter stage $m(w_i)$ depends on the previous filter output $m(w_{i-1})$, in which the filter operation is robust against changes of depth information between two filter stages and in which an update operation u is available that corrects the output of m.

The overall time from receiving the first input frame for the EURZ calculation and finishing the image processing calculation can be defined for the new architecture as:

$$T_{pipelined} = t_{Z1} + t_{Z2} + \cdots + t_{Zi} + t_{EURZ(Zi,Zi-1)} + t_u + t_{m(Wi)}$$

with $t_{z1}, t_{z2}, \ldots t_{zi}$ corresponding to the time for providing frames z1, z2, . . . zi, $t_{m\,(Wi)}$ being the time for image processing with parameter $w_i$, $t_{EURZ\,(Zi,\,Zi-1)}$ corresponding to the time calculating the extended unambiguity range frame between frames Zi, Zi−1 and $t_u$ corresponding to the time for updating and the filter output after the final EURZ image is available. This can be compared to an approach in which the image processing is applied only when the final EURZ image is available. The overall time from receiving the first input frame for the EURZ calculation and finishing the filter operation can be defined here as $$T_{direct} = t_{Z1} + t_{Z2} + \cdots + t_{Zi} + t_{EURZ(Zi,Zi-1)} + t_{m(W1)} + t_{m(W2)} + \cdots + t_{m(Wi)}$$

The difference between the conventional and the pipelined architecture is calculated by $$T_{difference} = T_{direct} - T_{pipelined} = t_{m(W1)} + t_{m(W2)} + \cdots + t_{m(Wi-1)} - t_u$$

For a EURZ sequence that implements the pipelined architecture the latency of the image processing when applying the filter is decreased if the difference is greater than zero. Therefore latency is improved if the following inequation is fulfilled:

$$t_u < t_{m(W1)} + t_{m(W2)} + \cdots + t_{m(Wi-1)}$$

The right-side term of this inequation can decrease if the number of filter passes exceeds the number of frames required for calculation of a non-ambiguous z-Image, but a minimum of two frames is required to ensure unambiguity, therefore at least one term $t_{m(W1)}$ remains. To summarize, in the above described embodiment an improvement in latency is achieved if the time for updating the image processing output with the corrected EURZ data is lower than the image processing operation m for a frame. This can be typically assumed to be true.

In view of the above it is apparent that an advantage is achieved by the modular architecture which starts image processing already when the frames with non-extended unambiguity range are available instead of waiting for the final image with extended unambiguity range and then starting the image processing. Therefore, the final image processed 3D data are available much earlier. This allows for example in real-time use of the 3D TOF camera an improved performance in which image processed 3D images can be provided with reduced latency.

Improvement of latency can be achieved for example for all filter algorithms which require multiple passes on the input image per se. The exact improvement of latency depends on the number of frames used for generating an unambiguous z-Frame and on the filter algorithm itself (number of passes). To apply the filter to the first captured frame an update function must exist that is able to update the filter result with the depth data of the next frame captured. The concrete implementation of this function depends on the filter algorithm itself and is therefore not part of this document.

The method can be extended to multiple pipelines in which EURZ continuous output can be provided. The number of frames the EURZ continuous mode generates is equal to the number of input frames. The final z-Frame is still a function of two or more previously captured frames, therefore the generated range extended frame has still the same overall latency as in the EURZ block.

A flow diagram 600 of an example method provided by the above described modular architecture is now explained with reference to FIG. 6. The flow diagram starts at 602 with obtaining first information including depth information with a first range of unambiguity. At 604 a first image processing on the first information is performed to generate first image processed information. In embodiments, the first image processed information may for example include frame 504A of FIG. 5. At 606 second information are obtained, the second information including depth information with a second range of unambiguity. It is to be noted that the first image processing and the obtaining of second information may be in some embodiments at least partially in parallel. As outlined above, the first information may be a data frame including depth information of a scene which has been determined by using a first modulation frequency (such as frame Z1 of FIG. 5) and the second information may be a data frame including depth information of the same scene which has been determined by using a second modulation frequency with frequency values different from the first modulation frequency (such as frame Z2 of FIG. 5). Furthermore, the depth information may be a representation of phase information, including first phase information derived from reflected light modulated by a first modulation frequency and second phase information derived from reflected light modulated by a second modulation frequency information different from the first modulation frequency. In such embodiments, the obtaining of the first phase information may include measuring in a pixel array a phase of light modulated by a first modulation frequency. The obtaining of the second phase information may include measuring in the pixel array a phase of light modulated by a second modulation frequency different from the first modulation frequency.

At 608, the first image processed information and the second information are used in a second image processing to generate second image processed information, In embodiments, the second image processed information may be for example the image processed frame 504B.

A further flow diagram 700 of an example method which may be provided by the above described modular architecture is now explained with reference to FIG. 7. The flow diagram starts at 702 with providing of first 3D information at a first stage of a pipelined digital image processing. The first 3D information includes depth information with a first range of unambiguity.

At 704, a first image processing is performed on the first information to generate first image processed information.

At 706, second 3D information is provided at a second stage of the pipelined digital image processing. The second 3D information includes depth information with a second range of unambiguity.

At 708, the first image processed information and the second information are used in a second image processing to generate second image processed information.

As outlined above, the first and second 3D information may include depth information of a same scenery generated by using different modulation frequencies. The second image processing may use in some embodiments at least partially information obtained from the first image filtering processing. Furthermore, the second image processing may further update a digital filtering result by using depth information of the third information. The combining of the first phase information and the second phase information at least increases the depth range unambiguity of the third information when compared to a depth range unambiguity of the first phase information or a depth range unambiguity of the second phase information.

The first and second image processing may in some embodiments include image processing of a same type with different parameter values. The first and second image filtering processing may include in some embodiments image filter processing of a different type. In some embodiments, a structure of an object or at least a part of a structure of an object may be filtered out based on the first filtering processing. The structure or part of the structure filtered out by the first filtering processing may then be masked to be not applicable to the second image filtering processing. The first and second image filtering processing may correspond to different stages of a modular image filtering.

A further flow diagram 800 of an example method provided by the above described modular architecture is now explained with reference to FIG. 8. The flow diagram starts at 802 with providing a first digital image processing to first information corresponding to 3D information of a scene, the first information inherently having uncertainty of depth information in a predetermined depth range. At 804, second information corresponding to 3D information of the scene are generated, the second information having no inherent uncertainty with respect to depth information or at least reduced inherent uncertainty of depth information compared to the first information. At 806, information derived from the first digital image processing is used for generating a modified 3D image of the scene.

Furthermore, according to some embodiments a 3D camera is provided comprising a digital image processing circuit, the digital image circuit being capable to provide digital image filtering based on a first image filtering processing applied to first phase information and a second image filtering processing applied to a second phase information. The first phase information is phase information of a first reflected optical signal modulated with a first modulation frequency and the second phase information is phase information of a second reflected optical signal modulated with a second modulation frequency different than the first modulation frequency.

Figure 9:
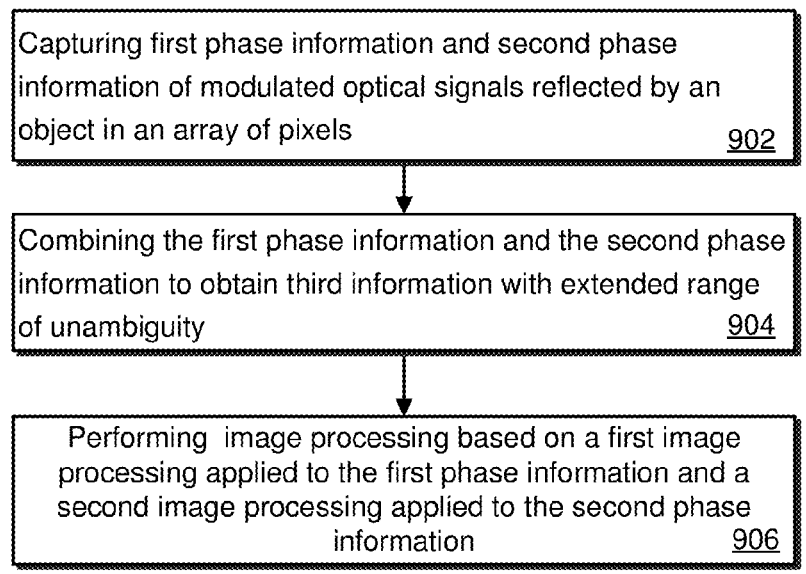
FIG. 9 shows a flow diagram according to an embodiment.

FIG. 9 shows a further embodiment. FIG. 9 starts at 902 with capturing in an array of pixels first phase information and second phase information of modulated optical signals reflected by an object. At 904, the first phase information and the second phase information are combined to obtain third information. At 906, digital image filtering is performed based on a first image filtering processing applied to the first phase information and a second image filtering processing applied to the second phase information.

While embodiments have been described for simplicity by using a first and second modulation frequency or first and second phase information with first and second ranges of unambiguity or depth information with first and second ranges of unambiguity, it is to be understood that the above concept can be extended to any number of different modulation frequencies or any number of different ranges of unambiguity. Thus other embodiments may use three or four or more different phase modulation frequencies or three or four or more ranges of unambiguity. Furthermore, it is to be understood that in embodiments for each of the different modulation frequencies or each of the different ranges of unambiguity a specific image processing may be applied in which the image processing parameters such as a filter width may be chosen and applied based on the respective modulation frequency or range of unambiguity. For example, if the filter parameters include different window sizes, the image processing may be applied in an order such that the window size increases with increasing range of unambiguity (decreasing modulation frequency).

Figure 6:
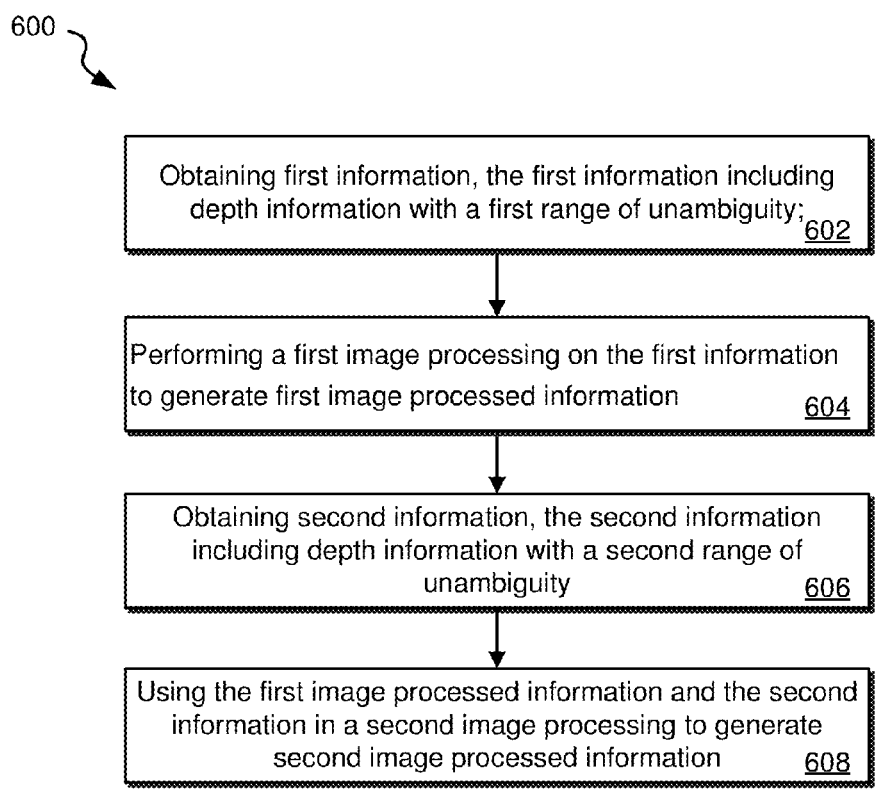
FIG. 6 shows a flow diagram according to an embodiment.
Figure 7:
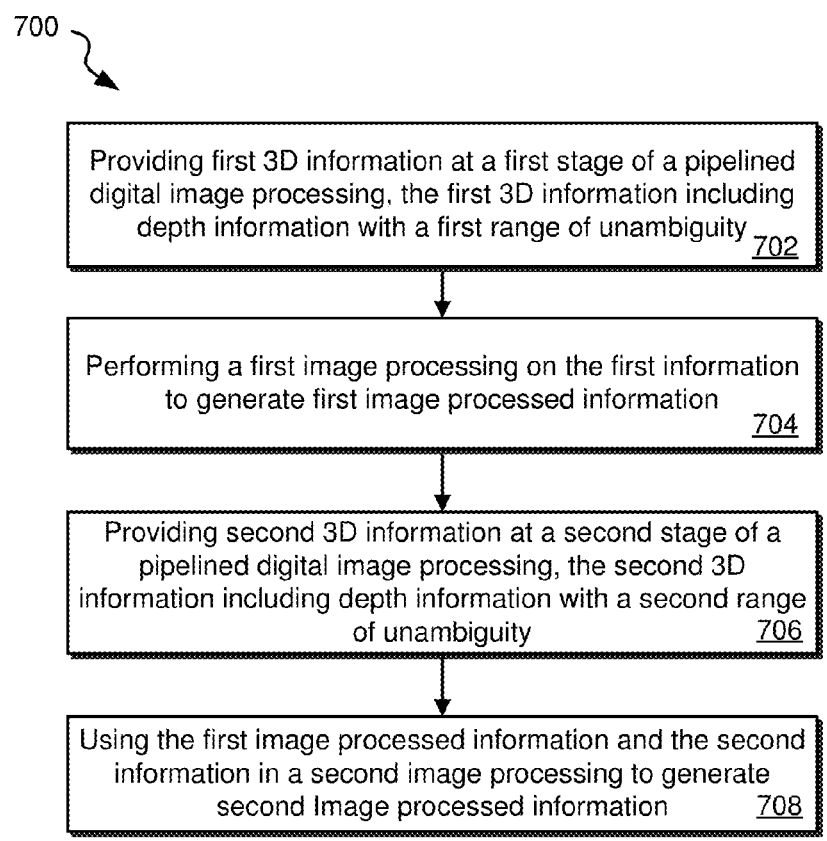
FIG. 7 shows a flow diagram according to an embodiment.
Figure 8:
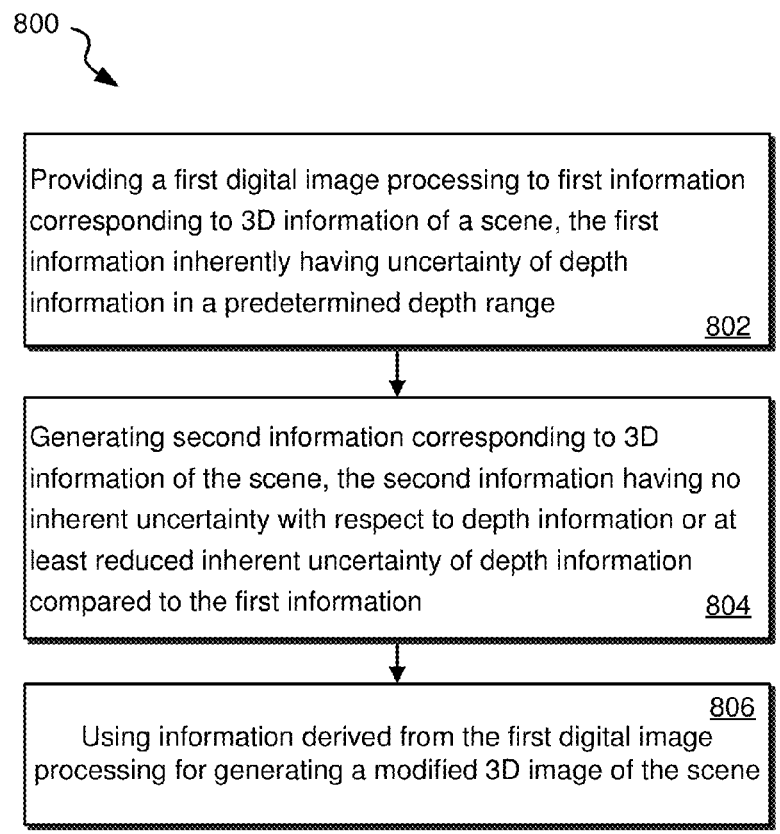
FIG. 8 shows a flow diagram according to an embodiment.

Furthermore, according to some embodiments, a computer program element is provided which when executed on a computing machine controls a modular image processing as described herein for example with respect to FIG. 6 or FIG. 7 or 8.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure. For example, while the image processing has been described for a 3D TOF system based on the photonic mixing principle, it may be understood that the above concepts can also applied to other 3D imaging systems.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter or receiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Furthermore, it is intended to include in this detailed description also one or more of described features, elements etc. in a reversed or interchanged manner unless otherwise noted.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A method comprising:
   obtaining first information, the first information including depth information with a first range of unambiguity;
   performing a first image processing on the first information to generate first modified information;
   obtaining second information, the second information including depth information with a second range of unambiguity; and
   wherein the first information is based on first phase information derived from reflected light modulated by a first modulation frequency and the second information is based on the first phase information and second phase information, the second phase information derived from reflected light modulated by a second modulation frequency information different from the first modulation frequency.

2. The method according to claim 1, further comprising:
   using the first modified information and the second information in a second image processing to generate second modified information.

3. The method according to claim 2, wherein the second modified information includes depth information with an increased range of unambiguity when compared to the first modified information.

4. The method according to claim 1, wherein obtaining the first phase information includes:
   measuring in a pixel array a phase of light modulated by a first modulation frequency;
   and obtaining the second phase information includes:
   measuring in the pixel array a phase of light modulated by a second modulation frequency different from the first modulation frequency.

5. The method according to claim 1, wherein the first information includes a frame of data entities indicative of depth information, wherein each data entity of the frame corresponds to a predetermined pixel of a pixel array.

6. The method according to claim 1, wherein the first image processing is an image filtering with a first filtering parameter value and the second information is obtained by a an image filtering with a second filtering parameter value, the second filtering parameter value being different from the first filtering parameter value.

7. The method according to claim 1, further comprising:
combining the first and second phase information to obtain the second information, wherein the performing of the first image processing and the combining of the first and second phase information are processed at least partially in parallel.

8. A method comprising:
capturing first phase information and second phase information of modulated optical signals reflected by an object;
combining the first phase information and the second phase information to obtain third information;
providing digital image processing based on a first image processing applied to the first phase information and a second image processing applied to the second phase information; and wherein the combining of the first phase information and the second phase information at least increases a depth range unambiguity of the third information when compared to a depth range unambiguity of the first phase information or a depth range unambiguity of the second phase information.

9. The method according to claim 8, wherein the second image processing uses at least partially information obtained from the first image processing.

10. The method according to claim 8, wherein the second image processing further updates a digital filtering result by using depth information of the third information.

11. The method according to claim 8, wherein the first phase information is phase information of a first optical signal modulated with a first modulation frequency and the second phase information is phase information of a second optical signal modulated with a second modulation frequency different than the first modulation frequency.

12. The method according to claim 8, wherein the combining of the first phase information and the second phase information at least increases the depth range unambiguity of the third information when compared to a depth range unambiguity of the first phase information or a depth range unambiguity of the second phase information.

13. The method according to claim 8, wherein the first and second image processing are image processing of a same type with different parameter values.

14. The method according to claim 8, wherein the first and second image processing are image processing of a different type.

15. The method according to claim 8, wherein a structure of an object or at least a part of a structure of an object is filtered out based on the first image processing.

16. The method according to 14, wherein the structure or part of the structure filtered out by the first image processing is masked to be not applicable to the second image processing.

17. The method according to claim 8, wherein the first and second image processing correspond to different stages of a modular image processing.

18. The method according to claim 16, wherein the modular image processing includes vertical edge detecting, horizontal edge detection, morphological operations with different window sizes.

19. A method comprising:
providing a first digital image processing to first information corresponding to 3D information of a scene, the first information inherently having uncertainty of depth information in a predetermined depth range;
generating second information corresponding to 3D information of the scene, the second information having no inherent uncertainty with respect to depth information or at least reduced inherent uncertainty of depth information compared to the first information;
using information derived from the first digital image processing for generating a modified 3D image of the scene.

20. The method according to claim 18, wherein the modified 3D image is obtained based on providing a pipelined image processing, wherein at least one stage of the pipelined image processing corresponds to the first digital image processing and at least one other stage of the pipelined filtering processing uses information with a different level of inherent uncertainty of the depth information.

21. The method according to claim 18, wherein the first information is obtained by measuring a phase shift corresponding to a first modulation frequency, wherein the second information is obtained by measuring a phase shift corresponding to a second modulation frequency and wherein third information is obtained by measuring a phase shift corresponding to a third modulation frequency, wherein the method further comprises:
providing a first morphological operation with a first window size on the first information;
providing a second morphological operation with a second window size on the second information;
providing a third morphological operation with a third window size on the third information, wherein the first, second and third window size are respectively different.

22. A method comprising:
providing a first digital image processing to first information corresponding to 3D information of a scene, the first information inherently having uncertainty of depth information in a predetermined depth range;
generating second information corresponding to 3D information of the scene, the second information having no inherent uncertainty with respect to depth information or at least reduced inherent uncertainty of depth information compared to the first information; and
using information derived from the first digital image processing for generating a modified 3D image of the scene, wherein the first and second digital image processing correspond to different stages of a modular image processing, wherein the modular image processing comprises vertical edge detecting, horizontal edge detection, morphological operations with different window sizes.

23. A method comprising:
obtaining first information, the first information including depth information with a first range of unambiguity;
performing a first image processing on the first information to generate first modified information; and
obtaining second information, the second information including depth information with a second range of unambiguity, wherein the first image processing is an image filtering with a first filtering parameter value and the second image processing is an image filtering with a second filtering parameter value, the second filtering parameter value being different from the first filtering parameter value.

* * * * *